Patented Oct. 19, 1954

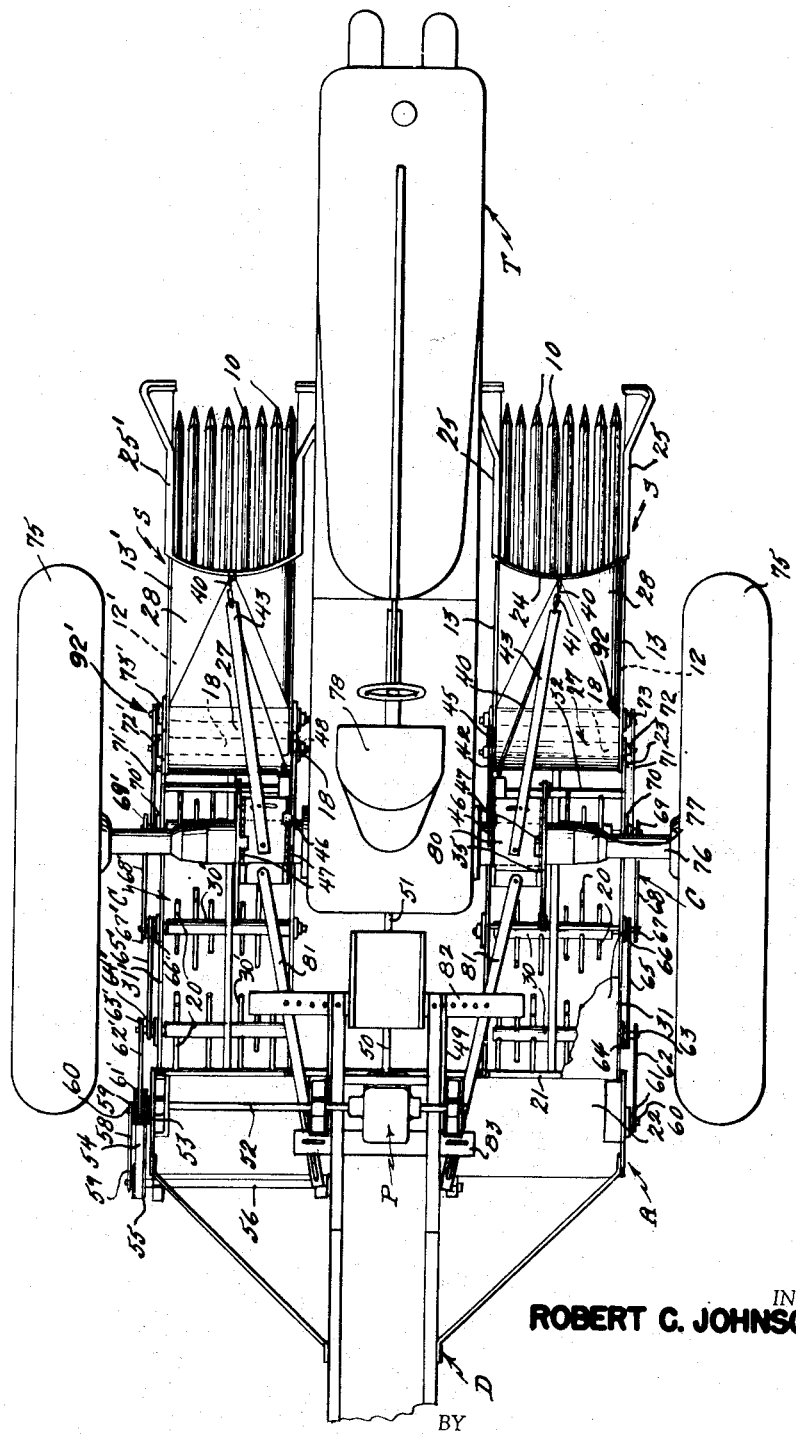

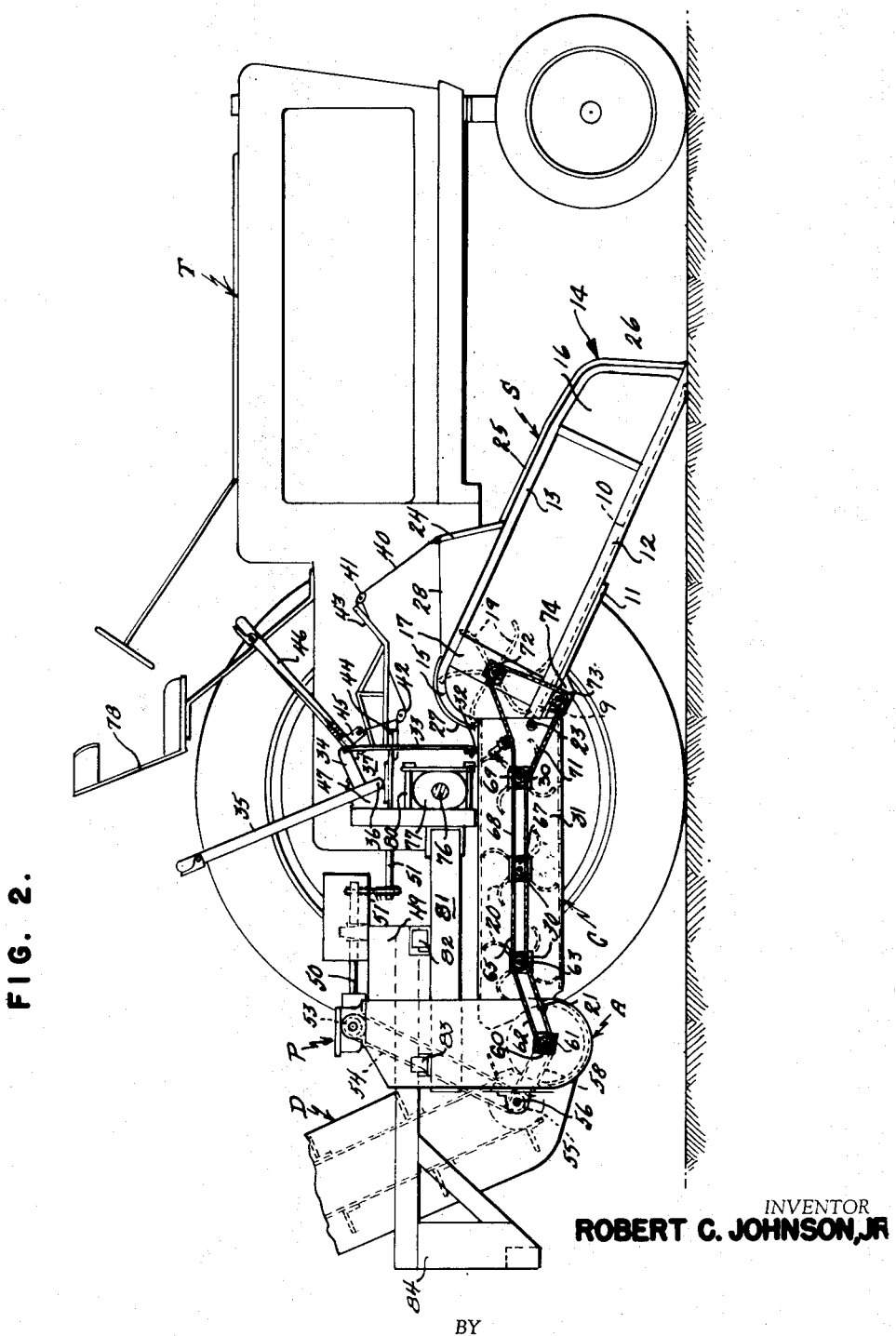

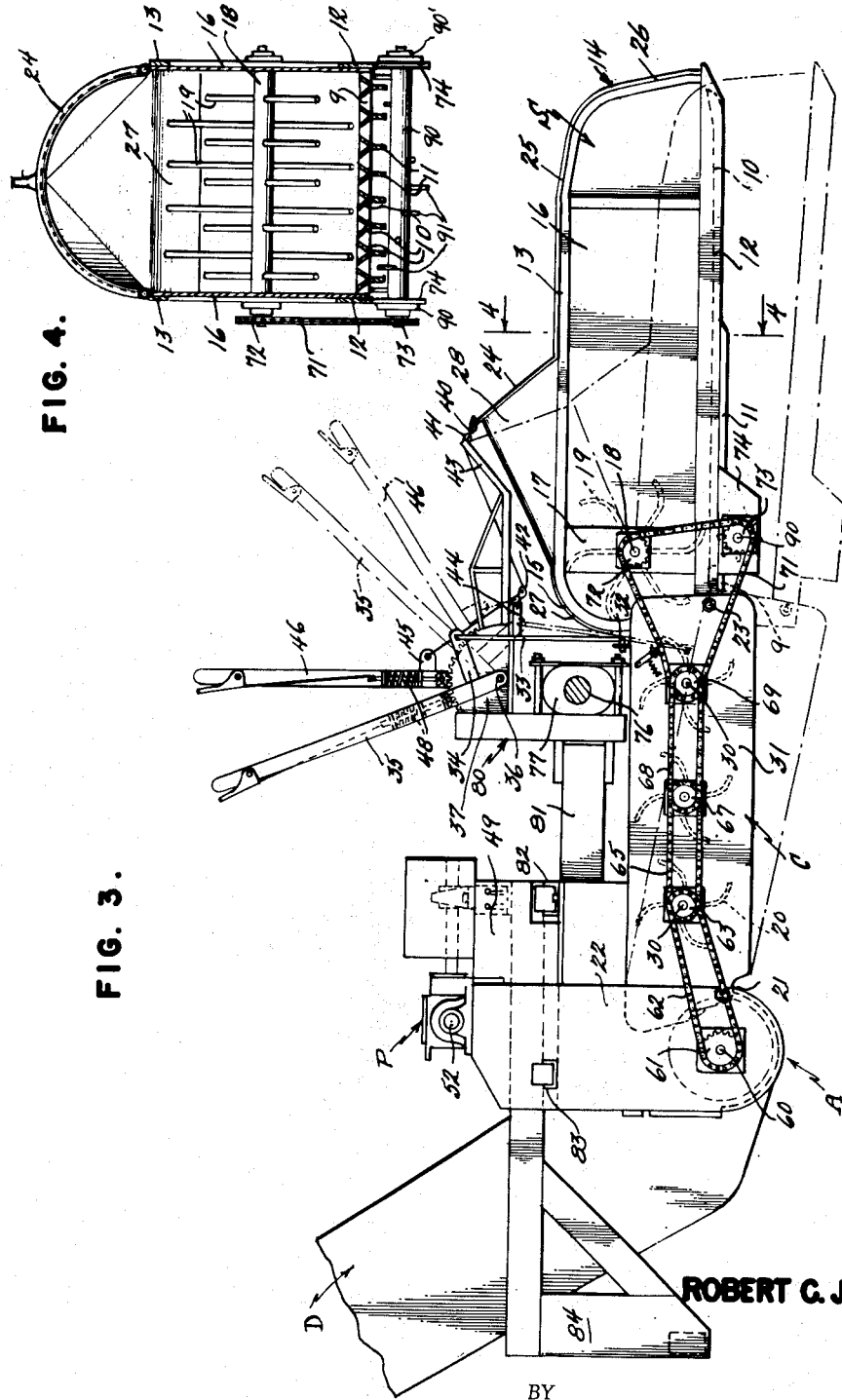

2,691,862

UNITED STATES PATENT OFFICE 2,691,862

COTTON HARVESTER

Robert C. Johnson, Jr., Lubbock, Tex.

Application January 11, 1952, Serial No. 266,000

3 Claims. (Cl. 56—34)

This invention relates to cotton harvesters, and more particularly relates to the adjustable suspension or mounting of the stripper units or mechanisms of the machine.

In use cotton harvesting machines are confronted with many various conditions. The cotton plants may be tall, short or of intermediate size, and the sizes of the plants may vary at different localities in the same field; and the rows of cotton plants may or may not be continuous so that the machine may encounter at times stretches where there are no plants. Also the contour of the ground varies not only in the forward direction but also sideways and thus presents different ground conditions as the machine travels along in operation. At the same time the cotton stripping fingers should be kept constantly near the ground; and, of course, the faster the machine travels along while stripping the cotton efficiently the better, since this conserves time and labor. Furthermore, the stripper must function to deliver the stripped cotton to the cleaning and conveying mechanism regardless of whether tall or short plants or plants of intermediate height are stripped, and must not spill the stripped cotton on the ground either when plants are being stripped or when a plantless stretch is being traversed.

Accordingly, a principal object of this invention is to provide a cotton harvester having a stripping unit or stripping mechanism so mounted and suspended on the machine that the unit can be adjusted readily, easily and quickly as plants of different heights and different ground conditions are encountered to strip the plants of their cotton most effectively and efficiently and to deliver the stripped cotton to the cleaning and conveying mechanism; the said adjusting of the stripper preferably being possible by the operator while seated in the driver's seat of the machine.

Another object of this invention is to provide an adjustable mounting or suspension of the character described and which is sturdy and durable, is reliable in performance, has a wide range of adjustment, is not cumbersome and is adjustable easily and quickly and comprises relatively few parts.

Another object of this invention is to provide in a cotton harvester a stripper unit or stripper mechanism which has stripper fingers or forks which are adjustable as desired into position approximating the horizontal or into inclined positions over a wide range of inclinations, and to various elevations relatively to the ground in accordance with plant and ground conditions encountered.

Another object of this invention is to provide in a cotton harvester a stripper unit or stripper mechanism adjustable to approximately horizontal position or into various inclined positions and to various elevations relatively to the ground, as desired, and a cleaning unit or cleaner mechanism so associated with the stripper unit as to receive stripped cotton from the stripper unit effectively in all adjusted positions of the stripper unit; and a further object of this invention is to provide an adjustable mounting or suspension for the cleaner unit or mechanism whereby the cleaner unit may be adjusted in accordance with the adjustment of the stripper unit to be in proper and effective cotton receiving position relatively to the stripper unit.

Another object of this invention is to provide an adjustable mounting or suspension of the character described for the cleaning unit or mechanism of the machine, and which mounting or suspension is sturdy and durable, is reliable in performance, has a wide range of adjustment, is not cumbersome and is adjustable easily and quickly by the operator of the machine while in the driver's seat, and comprises relatively few parts.

A further object of this invention is to provide an assembly of cotton stripper unit or stripper mechanism and cotton cleaning unit or cleaning mechanism, which assembly is so organized and constructed that it can be mounted in operative position on a tractor readily and easily and in a secure, sturdy and firm manner, and can be dismounted from the tractor when this is desired to be done.

Other objects of this invention will be in part obvious and in part pointed out hereinafter.

In one aspect of this invention, the invention comprehends the provision of a cotton harvester carrying a cotton stripper unit or mechanism, including elongated, forwardly directed stripping fingers or forks, and so mounted on the machine that the stripping fingers can be adjusted to an approximately horizontal position with the forward ends of the stripping fingers close to the ground, and thus be best suited to the stripping of short cotton plants; the mounting also permitting the raising of the rear ends of the stripping fingers or forks to position the fingers or forks at an inclination to the ground while the front ends of the fingers or forks are close to the ground, and thus position the stripping fingers to function most effectively and efficiently to strip tall plants or plants of intermediate heights; means being provided whereby the operator of the machine may adjust said stripper fingers or forks to said positions while the machine is operating in a field.

More particularly, in accordance with this invention I provide a cotton stripper and cleaning assembly which includes a forwardly directed stripper unit equipped with cotton stripping fingers or forks and a cotton cleaning unit which at its front end receives stripped cotton from the rear end of the stripper unit and passes the cotton rearwardly to suitable cotton discharging mechanism. The rear end of the cleaner unit is pivotally carried on a frame or housing part to swing thereon up and down, and the rear end of the stripper unit is pivotally carried on the forward end of the cleaner unit; the axis of the pivot being horizontal. Separate suspension means are connected to the stripper unit and to the cleaner unit whereby the cleaner unit may be swung on its rear pivot to position its front end at different elevations, and whereby the stripper unit may be swung on its pivot connection with the front end of the cleaner unit to position the front end of the stripper unit at different elevations relatively to the front end of the cleaner unit. The separate suspensions are preferably independently manipulatable manually to raise and lower either or both the cleaner and stripper units and to releasably lock the units in their adjusted elevations. With this arrangement the front ends of the stripping fingers or forks may be maintained at all times close to the ground, and which is the most effective and thorough stripping position for these ends of the stripping fingers or forks, and at the same time not only can the stripper unit be adjusted to meet variations in the ground contour but also the stripper unit can be adjusted to approximately horizontal position, and which is best for the stripping of low cotton plants since it insures the delivery of stripped cotton to the cleaning unit and prevents any stripped cotton from falling out from the front of the stripper should a plantless stretch be encountered; or the stripper fingers can be adjusted to an incline best suited to taller plants in accordance with the particular heights thereof. With the arrangement described the stripper unit can be placed in approximately horizontal positions by merely lowering the cleaner unit, since the front end of the cleaner unit and the rear end of the stripper unit move up and down together. When the cleaner unit is then raised its forward end and the rear end of the stripper unit rise and the stripper unit assumes inclined position, the degree of incline corresponding to the amount the front end of the cleaner unit is raised. Then by manipulating the separate stripper unit suspension the front end of the stripper unit may be raised and lowered to accommodate the stripper to varying ground conditions; or the front end of the stripper unit may be raised above stripping elevation so as to escape objects when the machine having this stripper assembly is being driven to or from the field of work.

There may be two of these stripper and cleaner unit assemblies mounted in operative positions on a suitable conveying vehicle, such as a tractor, one assembly on each side of the driver's seat, and two operating levers are provided at each side of the seat whereby the driver from his seat can manipulate separately the suspension of each cleaner unit and of each stripper unit.

The two stripper and cleaner unit assemblies may be identical except that the parts of one are arranged right-handedly and the parts of the other left-handedly relatively to the driver's seat. The machine is thus equipped to strip two rows of cotton on opposite sides of the machine simultaneously.

The two assemblies are preferably arranged to deliver stripped and cleaned cotton to conveying means which delivers the cotton to a common discharge conveyer for discharge from the machine.

The two assemblies may be suitably joined together, and if desired equipped with a suitable mounting whereby they can be mounted on a tractor. The apparatus for discharging the cleaned cotton from the machine may be a separate organization or joined to the stripping and cleaning assemblies to form therewith a complete cotton stripping, cleaning and discharging organization. Such organization and the units thereof are adapted to be driven by power taken off the power shaft of the vehicle on which the organization is mounted.

Four stripper and cleaner unit assemblies may be provided instead of two to provide a four row stripper, with two of the assemblies and the operating levers therefor on each side of the tractor on which they are mounted.

The invention accordingly consists of the features of construction, combinations of elements and arrangement of parts which will be more clearly pointed out hereinafter and the scope of the application of which will be set forth in the claims that follow.

In order that a clearer understanding of this invention may be had, attention is hereby directed to the accompanying drawings, forming a part of this application, and illustrating certain possible embodiments of this invention, and in which:

Figure 1 is a plan view of one possible embodiment of an organization of cotton stripping mechanism, stripped cotton cleaning mechanism and associated cotton conveying and discharging mechanism and drive mechanism mounted on a field tractor;

Figure 2 is a side elevation of the same, showing the stripping unit in an inclined stripping adjustment to operate on tall cotton plants;

Figure 3 is a side elevation of the cotton stripping, cleaning, conveying, discharging and drive mechanism removed from the tractor, and showing the stripping unit in full lines in elevated, approximately horizontal position to pass over objects when the harvester is being driven to and from the field of work, and showing in dot and dash lines the stripper unit lowered and in approximately horizontal position to operate on short cotton plants, the corresponding adjusted position of the cleaner unit also being shown in dot and dash lines.

In all of the three above figures only the lower portion of the discharging elevator is shown, the top portion being broken away.

Fig. 4 is an enlarged sectional view of one of a stripper unit and is taken on the line 4—4 of Fig. 3.

Similar reference characters refer to similar parts throughout the several views of the drawings.

Referring to the drawings, the harvester organization apart from the tractor includes on each side an assembly of a stripping unit S, and a cleaning unit C, a discharging elevator unit D between the rear ends of these assemblies, auger means A for delivering stripped and cleaned cotton from each of the two stripper and cleaner assemblies to the discharge unit D and a power transmission P adapted to receive power from a power take off shaft of a tractor on which the organization is mounted to drive the driven parts of the organization.

The bottom of each stripping unit is defined by a series of forwardly directed, parallel, flexible stripping fingers 10, angular in cross-section with the channel of the angle open upwardly and each having a reinforcing bar 11 extending for a distance along their under side and welded thereto. The fingers 10 and their reinforcing bars 11 are supported by a plate 9 carried on and extending between the rear ends of two opposite lower frame members 12; the rear ends of the stripping fingers butting up to this plate 9 and their reinforcing bars 11 extending some distance beyond the rear ends of the fingers 10 and abutting and being welded to the under side of the plate 9.

The frame members 12 and 12' are part of a housing which also includes upper frame members 13 and 13' which at the front extend downwardly, as at 14, and meet and are secured to the front end of frame members 12 and 12' respectively and at their rear, as at 15, curve downwardly and meet and are secured to the rear ends of frame members 12 and 12'. The housing also has side plates 16 and 16' along each side supported by frame members 12, 12' and 13, 13' respectively. Vertical members 17 and 17' on each side of the housing and secured to the lower and upper side frame members 12 and 12' and 13 and 13' thereof toward the rear end of the housing support a horizontal shaft 18 which has secured thereto a cotton advancing spider wheel 19 and which wheel may be of conventional construction.

The cotton cleaning unit C also includes a suitable housing in which are supported a series of cotton advancing spider wheels 20. The rear end of cotton cleaning housing C is pivotally supported on a horizontal pivot pin 21 carried on a housing 22 which is positioned just to the rear of cotton cleaning unit C. The front end of cotton cleaning unit C and the rear end of cotton stripper unit S are pivoted together to swing relatively to each other on a horizontal axis by means of pin 23. The cotton cleaning unit may be of conventional construction, and, as stated, receives stripped cotton from the stripper unit, cleans the cotton and delivers the cleaned cotton to the usual conveying augers which deliver the cleaned cotton to the discharge elevator.

The stripper unit also has a yoke and reinforcing member which may be metal tubing, fixed to the top thereof. The rear end 24 of this yoke and reinforcing member is bowed and bridges and is upwardly inclined from the top side frame members 13 and 13' of the stripper. Each leg of the bow is extended forwardly, as at 25, and then downwardly, as at 26, and rests on and is secured to the adjacent frame member 13 and 13'.

A curved plate 27 extends between and is secured to the rear portions 15 of the frame members 13 and 13', but does not extend down to the lower frame members 12 and 12', and leaves an opening at the rear end of the stripper unit S for the discharge of cotton therethrough into the open forward end of the cleaner unit C. This plate 27 is extended forwardly as at 28 in hood-like shape, having its forward edge conforming to the shape of the yoke member 24 and having this forward end fixed to the yoke member. See Figure 4. The side edges of the hood plate 28 are contiguous with the upper edges of the upper frame members 13 of the stripper unit.

The cleaner unit is provided with a plurality of parallel, horizontal shafts 30 journaled in suitable journals carried on the side walls 31 and 31' of the cleaner unit; and the cotton advancing spiders 20 are carried on these shafts. The top and the bottom of the cleaner unit are provided with suitable closing members to prevent the spilling of cotton from the cleaner unit. Secured to the top of the cleaner unit and extending between the two side walls 31 and 31' thereof is an angle iron 32 which is engaged by the lower end of a link rod 33, the upper end of which is engaged by the end of an arm 34 of an operating lever 35 which is pivoted on a stud or pin 36 provided on a supporting member 37.

As stated, it is desired to provide operable mechanism whereby the stripper unit may be swung up and down on the pivot pin 23 which is carried on the front end of the cleaner unit C so that the angular inclination of the stripper unit and its stripper fingers 10 may be adjusted relatively to the horizontal. To this end one end of a cable 40 is secured to the yoke member 24 preferably at its top and extends around a plurality of pulleys 41 and 42 which are supported by suitable frame work 43 and 44 and is fastened at the opposite end to an arm 45 of an operating lever 46 which may also be pivoted at its lower end on the pin or rod 36 or on a separate stud or pin. Associated with each lever is a quadrant, such as 47, suitably supported on the frame work of the organization and each lever is provided with a spring tensioned latching means 48 of usual design cooperating with a quadrant.

The power transmission P is supported on a member 49 of the frame work of the organization and has an input power shaft 50 adapted to be connected with the power shaft 51 of a tractor, as by pulleys and belt 51' or chain and sprockets, to take off power from the shaft 51 and transmit it to the power transmission P.

This power transmission has a drive shaft 52 extending to one side and is provided with a pulley 53 which drives a belt 54 which through a pulley 55 drives a transverse shaft 56, said shaft 56 driving the discharge elevator. Shaft 56 carries a sprocket 57 which by means of a chain 58 drives a sprocket 59, said sprocket 59 being carried on the transverse shaft 60 which carries the cotton advancing augers. Shaft 60 extends the full width of the cotton harvester. On each end of shaft 60 are sprockets 61 and 61' which drive chains 62 and 62' respectively, said chains engaging sprockets 63 and 63' respectively on the rear shafts 30 and 30' of the respective cleaner units. Each rearward shaft 30 and 30' has a second external sprocket 64 and 64' each of which drives an external chain 65 and 65' engaging sprockets 66 and 66' respectively on intermediate shafts 30 and 30' of the cleaner units, and by means of a second series of sprockets 67 and 67' on this shaft and chains 68 and 68' which engage sprockets 69 and 69' on the most forward shafts 30 and 30', the forward shafts are driven. The cotton advancing spider wheels 19 and 19' of each stripper unit is driven from forwardmost shafts 30 and 30' of the cleaner units by means of sprockets 70, 70' and chains 71 and 71' which engage sprockets 72 and 72' respectively on shafts 18 of the spider wheels 19 and 19' and run over a sprocket 73 and 73' carried on shafts 90 and 90' which are journalled, as at 92 and 92', in two plates 74 and 74' secured to the bottom of the stripper unit towards their rear ends. Shafts 90 and 90' carry a series of tines 91 and 91' in staggered relation, the tines being just long enough to move up between the stripper fingers 10, keeping that space cleaned out and preventing clogging.

The organization of stripper units, cleaner units, discharge elevator, means for conveying the cotton from the cleaner units to the discharge mechanism, the means for elevating and lowering the stripper units on the pivots 23 and elevating the cleaner units on the pivot pins 21 and the means for driving the various cotton advancing spider wheels the conveying augers between the cleaner units and the discharge mechanism and for driving the discharge elevator are adapted to be mounted on a tractor, such as T, and which is shown to have wheels 75 having axles 76, axle housings 77 and a driver's seat 78, as well as the usual power plant and transmission. The organization of cotton stripping units and cotton cleaning units, cotton discharge mechanism and related parts should be so mounted on the tractor that the two assemblies of cotton stripper and cotton cleaning units and the operating levers of the respective units will be disposed on opposite sides of the driver's seat and with the operating handles accessible for operation by the driver while occupying the seat. Means to so mount the organization on a tractor may include on each side a clamp of box-like formation, such as 80, adapted to embrace and be clamped tightly to the opposite axle housings 77. Extending rearwardly from each of these box-like attachment and supporting members 80 may extend a channel iron 81 which in turn supports two channel irons, 82 and 83 which bridge between the two channel irons 81, and on these channel irons 82 and 83 the harvester may be supported. Frame work, such as 84, may also be supported on the channel irons 82 and 83 to extend rearwardly therefrom and to support the cotton discharging elevator mechanism. However, any suitable means may be provided for properly mounting the harvester organization on a tractor in a rigid, sturdy and efficient manner.

When the harvester is being driven to and from the field of work both assemblies of stripper and cleaning units are preferably elevated to their fullest extent (Fig. 3 full lines) so as to escape objects encountered during the travel of the harvester to the field of work. To elevate the stripper and cleaner units the operating levers 35 and 46 thereof are drawn rearwardly on their quadrants to the fullest extent possible as shown in full lines in Figure 3 of the drawings. Then if when reaching the cotton field tall cotton plants are to be stripped the operating lever of the stripper units are adjusted forwardly until the front end of the stripper fingers are close to the ground. This will place the stripper units in an inclined position and the stripper fingers will strip the cotton plants progressively from ground up with the uppermost bolls of cotton being stripped near the center of the stripper units. The cotton bolls are then engaged by and advanced by the cotton advancing spider wheels 19 of the stripper units and are projected into the open front end of the cleaner units where the stripped cotton will be engaged and advanced by the cotton advancing wheels 20 of the cleaner units and discharged into the receiving end of the auger conveyor mechanisms, whereby the cotton will be advanced to and into the discharge mechanism or elevator.

If short cotton plants are encountered it is preferable that the stripping fingers be not inclined to any great extent since if the fingers are inclined to any great extent the plants will be stripped from bottom to top by the time they enter only a comparatively short distance into the stripper unit and consequently the stripped cotton will have a tendency to fall forwardly out of the stripper unit, particularly if a bare spot should should be encountered. Also, there is a tendency when stripping short plants with the stripper units substantially inclined that the stripped cotton will not be carried to the cotton advancing spider wheel 19 for discharge into the cleaner unit. In order to avoid these conditions it is preferable to adjust the stripping unit to approximately horizontal position when stripping short cotton plants. To make this adjustment the operating handle for raising and lowering the cleaner unit is moved forwardly to lower the front end of the cleaner unit. This lowers the rear end of the stripper unit in unison with the lowering of the front end of the cleaner unit and places the stripper unit in the approximately horizontal position. These positions of stripper and cleaner units and their operating levers are shown in dot and dash lines in Figure 3.

From the above description, considered in connection with the accompanying drawings, it should be apparent to those familiar with harvester construction, that the objects of this invention previously set forth herein have been attained.

It is also to be understood that as many changes can be made in the above construction and as many embodiments of this invention may be had without departing from the scope thereof, all matter set forth in the above description or shown in the accompanying drawings is to be interpreted as illustrative and not in a limiting sense.

What I claim is:

1. In combination with a harvester having a carriage adapted to move along the ground; a stripper conveyed by the carriage and having cotton gathering and discharge end portions, said stripper being sustained in floating pivotal relation to the carriage; a first means engaging said stripper from said carriage adjacent the discharge end portion of the stripper, said means being extendible and retractible to alternately elevate, lower and sustain the stripper; a second means engaging the stripper from said carriage intermediate the cotton discharge end portion and the cotton gathering end portion of the stripper, said second means being extendible and retractible to alternately swing the stripper arcuately with respect to the carriage, to retain the stripper for movement of said first means or to move the stripper in position with said first means.

2. In combination with a harvester having a carriage adapted to move along the ground; at least one stripper unit having open cotton gathering and cotton discharge end portions, said stripper being sustained adjacent the discharge end in horizontal, floating pivotal relation to the carriage; a first suspension means engaging the stripper intermediate the end portions thereof, said first suspension means being extendibly and retractibly mounted upon the carriage for manipulation of the tripper angularly with respect to the ground; a second suspension means for the stripper engaging the stripper adjacent the discharge end portion thereof, said second suspension means being extendibly and retractibly mounted upon the cariage permitting manipulation of the stripper vertically witlh respect to the ground; both said first and said second suspension means being alternately manipulable independently, sequentially or simultaneously to vary both angular disposition and height of the stripper with respect to the ground.

3. The combination of claim 2 further comprising: a cotton cleaner having its front end portion in communication with the discharge end portion of said stripper, said end portions of said cleaner and stripper being mounted together on a horizontal joining pivot means pivotally mounting said cleaner at its rear end portion on said carriage to pivot on a horizontal axis; and suspension means connected to said cleaner and stripper at said joining pivot and connected to said carriage suspending the cleaner at its front end and the stripper at its rear end from said carriage, said means being manipulable to elevate and lower said joining pivot to elevate and lower the front end portion of the cleaner and the rear end portion of the stripper at said joining pivot.

References Cited in the file of this patent

UNITED STATES PATENTS

| Number | Name | Date |
|---|---|---|
| 242,189 | Cunningham | May 31, 1881 |
| 242,301 | Goodwin | May 31, 1881 |
| 247,653 | Johnson | Sept. 27, 1881 |
| 801,498 | Wyman | Oct. 10, 1905 |
| 938,864 | Houghton | Nov. 2, 1909 |
| 1,059,270 | Brown | Apr. 15, 1913 |
| 1,106,019 | Wilcoxson | Aug. 4, 1914 |
| 1,638,867 | Melton | Aug. 16, 1927 |
| 1,750,439 | Streun | Mar. 11, 1930 |
| 1,789,803 | Boone | Jan. 20, 1931 |
| 1,870,039 | Conrad | Aug. 2, 1932 |
| 1,933,922 | Morse | Nov. 7, 1933 |
| 2,001,079 | Court | May 14, 1935 |
| 2,064,394 | Thomann | Dec. 15, 1936 |
| 2,123,405 | Court | July 12, 1938 |
| 2,445,162 | Wallace | July 13, 1948 |
| 2,514,519 | Ryan | July 11, 1950 |
| 2,517,063 | Wallace | Aug. 1, 1950 |
| 2,544,411 | Altgelt | Mar. 6, 1951 |